Oct. 22, 1957  A. E. ROCKEY  2,810,555

LIQUID MIXING AND DISPENSING MECHANISM

Filed July 23, 1954

*INVENTOR.*
ALBERT E. ROCKEY
BY
*Attorney*

United States Patent Office 2,810,555
Patented Oct. 22, 1957

2,810,555

LIQUID MIXING AND DISPENSING MECHANISM

Albert E. Rockey, Detroit, Mich.

Application July 23, 1954, Serial No. 445,365

3 Claims. (Cl. 259—44)

My invention relates to a new and useful improvement in a liquid mixing and dispensing mechanism whereby liquid may be deposited in a receptacle and rapidly mixed and dispensed from the receptacle.

It is an object of the present invention to provide a mechanism of this class which will be simple in structure, economical of manufacture, durable, compact, light, easily and quickly operated, and highly efficient in use.

Another object of the invention is the provision in a mechanism of this class of a receptacle associated with a motor-driven mixing mechanism so arranged and constructed that the receptacle may be tilted on its mountings to pour the contents therefrom without disturbing the mounting of the motor on the receptacle.

Another object of the invention is the provision of a mechanism of this class having a receptacle provided with a motor-driven mixer, with the motor contained in a housing and the housing forming a closure for the upper end of the receptacle and mounted on the receptacle in such a manner that the receptacle may be easily and quickly detached from and attached to the motor housing without disturbing the mounting of the motor housing on a suitable support.

Other objects will appear hereinafter.

It is recognized that various modifications and changes may be made in the detail of structure illustrated without departing from the invention, and it is intended that the present disclosure shall be considered to be but the preferred embodiment.

Forming a part of this application are drawings in which.

Figure 1:
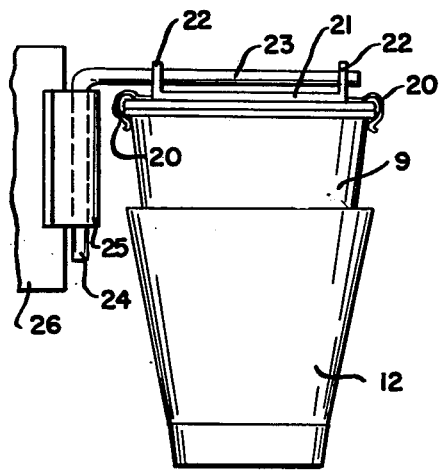
Fig. 1 is a side elevational view of the invention, showing it mounted.
Figure 2:
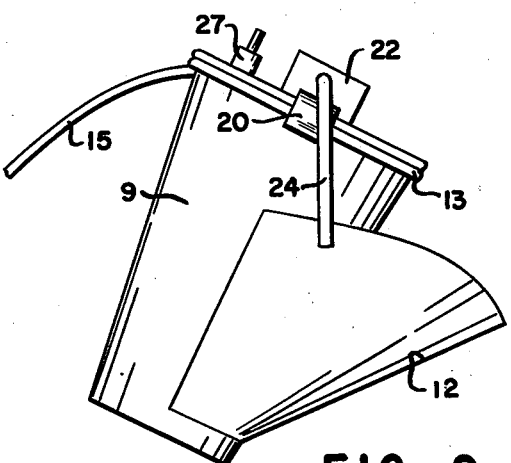
Fig. 2 is a side elevational view of the invention taken at right angles to Fig. 1.
Figure 3:
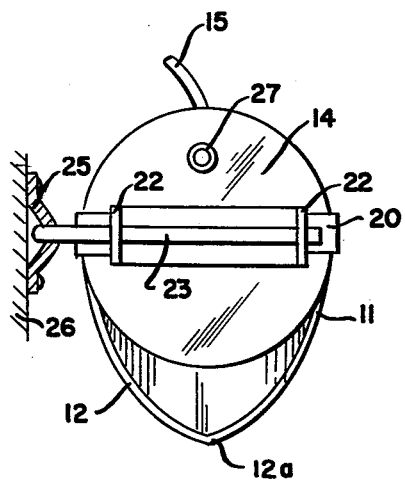
Fig. 3 is a top plan view of the invention, showing it mounted.
Figure 4:
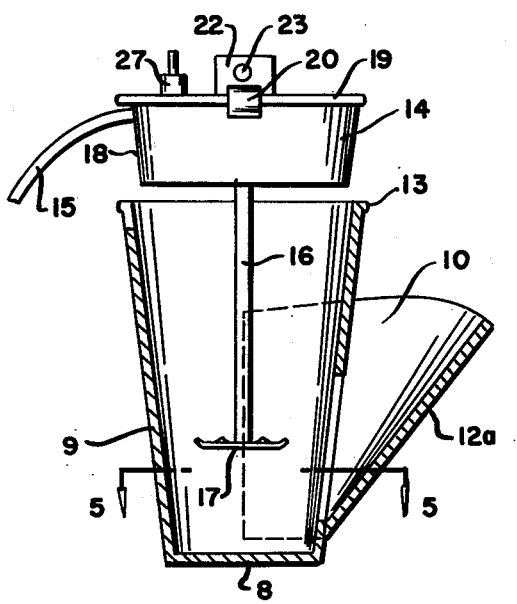
Fig. 4 is a longitudinal central sectional view of the invention with the motor housing shown in separated relation
Figure 5:
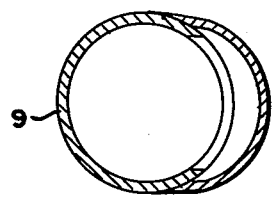
Fig. 5 is a sectional view taken on line 5—5 of Fig. 4.

As shown in the drawings, the invention comprises a receptacle 9 having an open upper end and a bottom 8. The receptacle 9 is cut away between its ends as at 10 to provide a large opening or slot extending substantially half way around the receptacle, the receptacle being circular in cross section and tapering to smaller dimensions toward the lower end.

Secured to the receptacle at the location of the slot 10 and extending above and below the same is a spout which will serve as a pouring spout and also as a container for the liquid during the mixing operation, the cubical contents of the spout being substantially equivalent to the cubical contents of the receptacle.

This spout is provided with the tapered forward end 12a and side walls 11 and 12 which are secured to the outer surface of the receptacle 9. A housing 14 encloses the electric motor, and an electric cable 15 leads into the housing 14 to supply electrical energy to the motor. This motor is used to rotate a shaft 16 on which is mounted a mixer 17.

It will be noted that the periphery 18 of the housing 14 is tapered so that, when it is inserted into the open end of the receptacle, a snug, tight fit is provided.

The receptacle 9 is provided with the outwardly projecting flange 13 at the open end thereof, and the housing 14 is provided with a peripheral flange 19 which rests upon the flange 13. Spring clips 20 are carried by the housing 14 and serve to snap around the flange 13 to retain the housing 14 in position on the receptacle 9.

Mounted on the outer face of the housing 14 is the U-shaped member comprising a bight 21 and the upwardly projecting legs 22. Projected through the legs 22 is a rod 23 having the angularly turned portion 24 which projects through the knuckle 25 mounted on a suitable support 26.

A switch 27 is carried by the housing 14 and controls the operation of the electric motor contained within the housing.

In use, the liquid to be mixed may be poured into the receptacle through the spout. After the mixing operation, the entire structure can be rocked on the rod 23 as an axis so that the receptacle may be tilted sufficiently to pour the liquid therefrom outwardly through the spout. In this pouring operation, of course, the relation of the motor and its parts to the receptacle is in no manner disturbed.

The motor is mounted on the receptacle in such a manner that the receptacle is ordinarily by gravity maintained in an upright position. Consequently, after the pouring operation, the receptacle will automatically return to an upright position.

Should it be desired to carry the receptacle a distance from where it is usually mounted, the receptacle may be easily and quickly disconnected from the housing 14 by releasing the spring clips 20. This operation would not disturb the mounting of the motor on the support 26.

Experience has shown that a mixing and dispensing mechanism of this class is highly efficient in use and has proven most convenient and a time and labor saver in dispensing mixed liquids.

What I claim is:

1. In a mechanism of the class described, a receptacle tapered from one end to the other and having a slot formed therein, said receptacle being circumferential in cross-section and said slot being at least semi-circular, and said slot being positioned between the upper and lower ends of said receptacle; a chute mounted on said receptacle and extending around said slot and extending above and below the same; a motor housing having a tapered periphery for fitting within the open end of said receptacle; a shaft projecting through said housing and rotatable in said receptacle; a mixing element on the end of said shaft; a peripheral flange on the open end of said receptacle; a peripheral flange on one end of said housing engageable with the flange on said receptacle; spring clips carried by said housing for clipping over the flange of said receptacle for securing said housing to said receptacle; a U-shaped member mounted on the outer side of said housing and having a pair of spaced apart legs projecting outwardly therefrom; a rod projected through said legs, said receptacle being swingable on said rod; an angularly turned end on said rod; and, a knuckle on a stationary support for receiving the angularly turned end of said rod for swingably mounting said receptacle for swinging movement on a vertical axis.

2. A device of the class described, comprising; a receptacle open at its upper end and having, intermediate its ends, a circumferentially extending slot, said receptacle being circumferential in cross-section and said slot being extended to at least a semi-circle; a chute mounted on said receptacle enclosing said slot and projecting outwardly from the end of said receptacle, said chute being of substantially the same cubical contents as said receptacle; a peripheral flange on the open end of said receptacle, said receptacle being tapered to smaller dimensions proceeding from the open end towards its closed end; a motor housing having a tapered periphery for fitting snugly into the open end of said receptacle and enclosing the motor; a shaft projecting from one side of said housing into said receptacle and rotatable therein; a mixing element on the end of said shaft in said receptacle; and, means cooperating with said housing for mounting said receptacle for swingable movement on a horizontal axis and a vertical axis.

3. A device of the class described, comprising; a receptacle open at its upper end and having, intermediate its ends, a circumferentially extending slot, said receptacle being circumferential in cross-section and said slot being extended to at least a semi-circle; a chute mounted on said receptacle enclosing said slot and projecting outwardly from the end of said receptacle, said chute being of substantially the same cubical contents as said receptacle; a peripheral flange on the open end of said receptacle, said receptacle being tapered to smaller dimensions proceeding from the open end towards its closed end; a motor housing having a tapered periphery for fitting snugly in the open end of said receptacle and enclosing the motor; a shaft projecting from one side of said housing into said receptacle and rotatable therein; a mixing element on the end of said shaft in said receptacle; means cooperating with said housing for mounting said receptacle for swingable movement on a horizontal axis and on a vertical axis; and, spring means for engaging the flange on said receptacle for retaining said housing on said receptacle.

References Cited in the file of this patent

UNITED STATES PATENTS

| | | |
|---|---|---|
| 463,335 | Mulford | Nov. 17 1891 |
| 1,085,858 | Fulton | Feb. 3, 1914 |
| 2,257,238 | Hexter | Sept. 30, 1941 |
| 2,513,254 | Savage et al. | June 27, 1950 |